United States Patent

Braathen

[11] Patent Number: 6,059,193
[45] Date of Patent: May 9, 2000

[54] FITTING HOUSING DEVICE FOR A WATER HEATER

[76] Inventor: Thor Frølich Braathen, N-3359, Eggedal, Norway

[21] Appl. No.: 09/130,314

[22] Filed: Aug. 7, 1998

[30] Foreign Application Priority Data

Aug. 13, 1997 [NO] Norway ..................................... 973722

[51] Int. Cl.[7] .................................................. G05D 23/13
[52] U.S. Cl. ..................................... 236/12.14; 137/599.1
[58] Field of Search ............................... 236/12.1, 12.14; 137/599.1

[56] References Cited

U.S. PATENT DOCUMENTS

| | | | |
|---|---|---|---|
| 1,891,926 | 12/1932 | Hall | 236/12.14 |
| 2,698,029 | 12/1954 | Branson | 236/12.1 |
| 2,895,676 | 7/1959 | Kraft | 236/12.14 |
| 3,007,491 | 11/1961 | Evans | 137/599.1 |
| 3,134,366 | 5/1964 | Miller | 236/12.14 |
| 3,813,035 | 5/1974 | Wobig | 137/599.1 |
| 5,205,482 | 4/1993 | Ems | 236/12.1 |
| 5,647,531 | 7/1997 | Kline et al. | 236/12.14 |

FOREIGN PATENT DOCUMENTS

| | | |
|---|---|---|
| 87259 | 8/1992 | Finland . |
| 157153 | 10/1987 | Norway . |
| 162982 | 12/1989 | Norway . |
| 164863 | 8/1990 | Norway . |

Primary Examiner—William E. Tapolcal
Attorney, Agent, or Firm—Browdy and Neimark

[57] ABSTRACT

A fitting housing device which is to be equipped with a thermostat-controlled mixing valve (15) and a combined shutoff and reflux valve (21) for connection in a cold water inlet pipe and hot water outlet pipe of a water heater, where the fitting housing (1) has two channels (8, 10) for cold water and hot water, respectively, and a cross connection (27) for cold blending water therebetween. A mixing valve (15) is arranged in the hot water channel (8). The mixing valve (15) is connected to a regulating spindle (16), which is arranged in a first spindle bore (12). The spindle of the shutoff and reflux valve (21) can be arranged in a second spindle bore (11). The first spindle bore (12) and the second spindle bore (11) are designed such that the mixing valve (15) and the shutoff and reflux valve (21) are interchangeable relative to one another, to allow the use of the same valve housing (1) in fittings for mounting in the top, bottom and side of the hot water tank.

20 Claims, 7 Drawing Sheets

FITTING HOUSING DEVICE FOR A WATER HEATER

The present invention relates to a fitting housing device in accordance with the preamble in claim 1.

Such fitting housings are known from the applicant's own Norwegian Patent No. 157 153, which describes a fitting having a thermostat-controlled mixing valve and a combined shutoff and reflux valve. A cold water inlet pipe is positioned concentrically inside a hot water outlet pipe, the hot water outlet pipe becoming an oblique channel in the valve housing. At the outlet of this oblique channel there is located a thermostat body, which forms a part of the thermostat-controlled mixing valve. From the cold water inlet, cold water first flows past the combined reflux and shutoff valve, past the mixing valve, where, depending upon the position of the mixing valve and the temperature of the effluent hot water, some of the water flows past the thermostat body and mixes with the effluent hot water. The rest of the cold water is passed down into the bottom of the hot water tank through the inner channel in the connection piece.

The above-mentioned fitting housing functions extremely well when it is mounted as intended, namely to the top of the hot water tank. However, it would not function as a housing for a mixer fitting, if it were to be mounted in the bottom of the tank. This is so because, due to its construction, the hot water must flow out through the outer channel in the concentric connection piece. If the valve were to be mounted in the bottom of the tank, only cold water, which by nature lies at the bottom of the tank, would flow out through this channel.

Finnish Patent No. 87259, also belonging to the same applicant, makes known another type of mixer fitting, but here both the mixing valve and the combined shutoff and reflux valve are positioned on the same spindle. This fitting cannot be used for mounting in the bottom of the tank either. Another problem with this fitting is that it has been found difficult to obtain a completely tight reflux valve which does not have some leakage. In several countries it is a requirement that reflux valves in such fittings must not leak.

Norwegian Patent No. 164 863, another patent in the name of the present applicant, also describes a housing having a mixing valve and combined reflux and shutoff valve on the same spindle. Here, however, the oblique channel, which in the fitting housing of FI-87259 conveys hot water out of the hot water tank, and therefore extends in the direction of the mixing valve thermostat body, extends obliquely from the combined reflux and shutoff valve, and is designed to carry cold water into the bottom of the hot water tank. However, this valve cannot be used for mounting to the top of the tank. In addition, this valve also has the same problem of a small leakage in the reflux valve.

NO 162 982, belonging to the same applicant, should also be mentioned as an example of prior art. This housing for the mixer fitting is in essence based on the same principle as the fitting housing of FI 87259.

The object of the present invention is to provide a mixer fitting housing for connection to a hot water tank, which can be used for connection to both the top and the bottom of the tank, and optionally also to the side. This is accomplished with a fitting housing having the characteristic features according to the characterising clause of claim 1.

With a fitting housing according to the invention, production costs are cut considerably, as there is no longer any need to produce two fitting housings, for respectively top mounting and bottom mounting, as one fitting housing will be capable of being used for both types of mounting.

The invention will now be explained in more detail with reference to the accompanying drawings, wherein.

Figure 1:
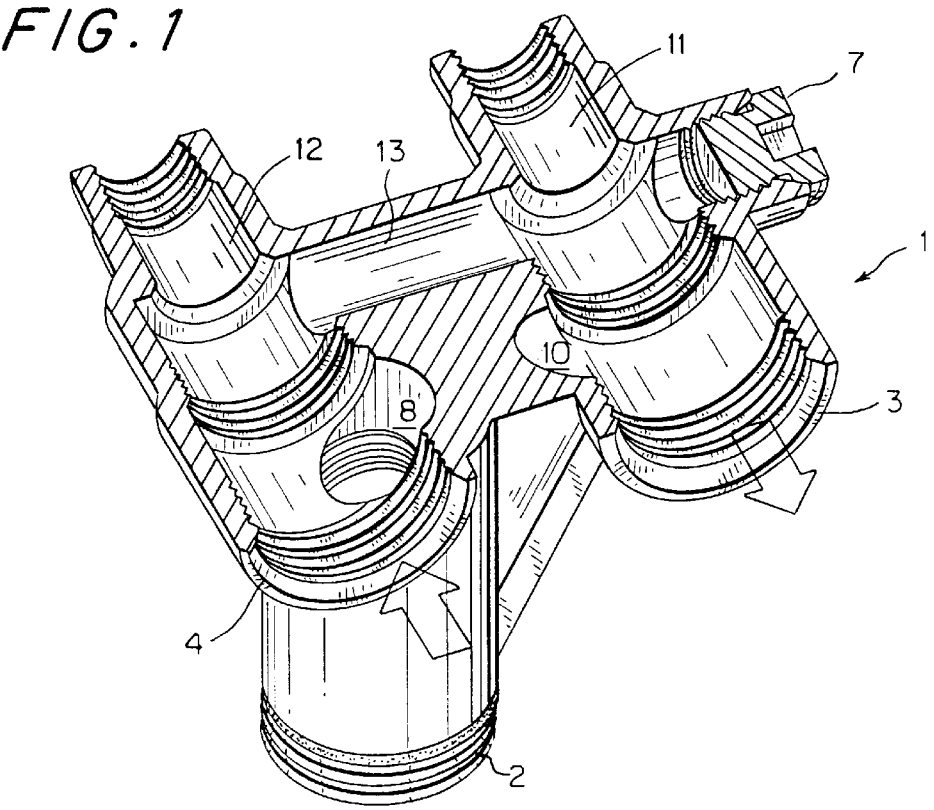
FIG. 1 is a perspective view of the fitting housing configured for top mounting, with a section through the spindle bores.
Figure 2:
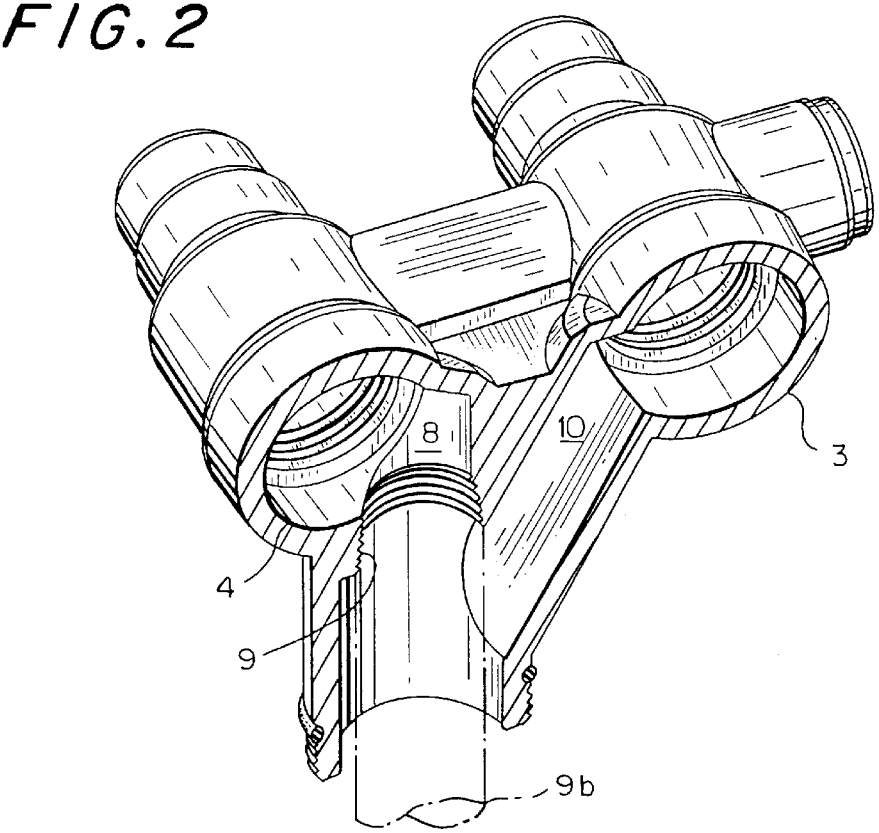
FIG. 2 shows the fitting housing according to FIG. 1, with a section through the connection piece for connection to the hot water tank.

FIGS. 1 and 2 show a fitting housing 1 for the fitting according to the invention intended for top or side mounting. The fitting housing 1 has a connection piece 2 for connection to a water heater. Furthermore, it is equipped with a cold water inlet 4 and a blended water outlet 3. As will be described in more detail below, when the fitting is mounted to the bottom of the water heater, the channel 3 is used as cold water inlet, whilst the channel 4 will be used as blended water outlet. However, in the case of a top mounting of the fitting, the channel 3 is used as blended water outlet, whilst the channel 4 will be used as cold water inlet.

There is also a pipe stub 7 which, in the case of a bottom mounting, is used for draining the water heater.

In FIG. 2 a section has been made through the connection piece 2. From the connection piece 2 a channel 8 runs up towards the blended water outlet 3. In this channel 8 there are provided threads 9 for receiving a pipe 9b which extends from the bottom of the hot water heater to carry cold water down from the channel 8. A channel 10 extends obliquely from the connection piece 2 towards the blended water outlet 3. The channel 10 is connected to a channel which is formed by the annular space around the pipe which is screwed into the threads 9. Hot water will be passed up through the channel 10 to the mixing chamber inside the blended water outlet 3.

FIG. 2 shows a section through the cold water inlet 4 and the blended water outlet 3. Here, two spindle bores 11, 12 are revealed. Spindle bore 12 is designed to receive a spindle for a combined reflux and shutoff valve, which will be described in more detail later. The spindle bore 11 is designed to receive a spindle for a mixing valve, which will also be described in more detail below. As can be seen, the spindle bores 11 and 12 are of an identical design, and the reason for this will also be described below.

A cold water connection 13 extends between the spindle bores 11 and 12. In FIG. 2 channels 8 and 10 can also be seen.

Figure 3:
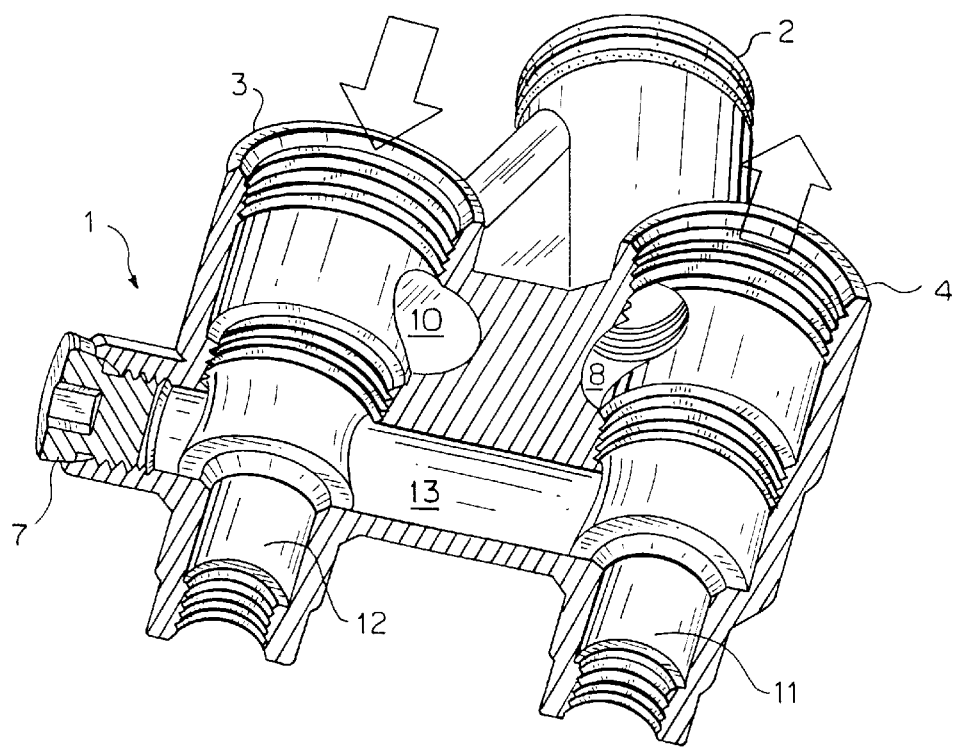
FIG. 3 shows the fitting housing configured for bottom mounting, with a section through the spindle bores and the cross connection.
Figure 4:
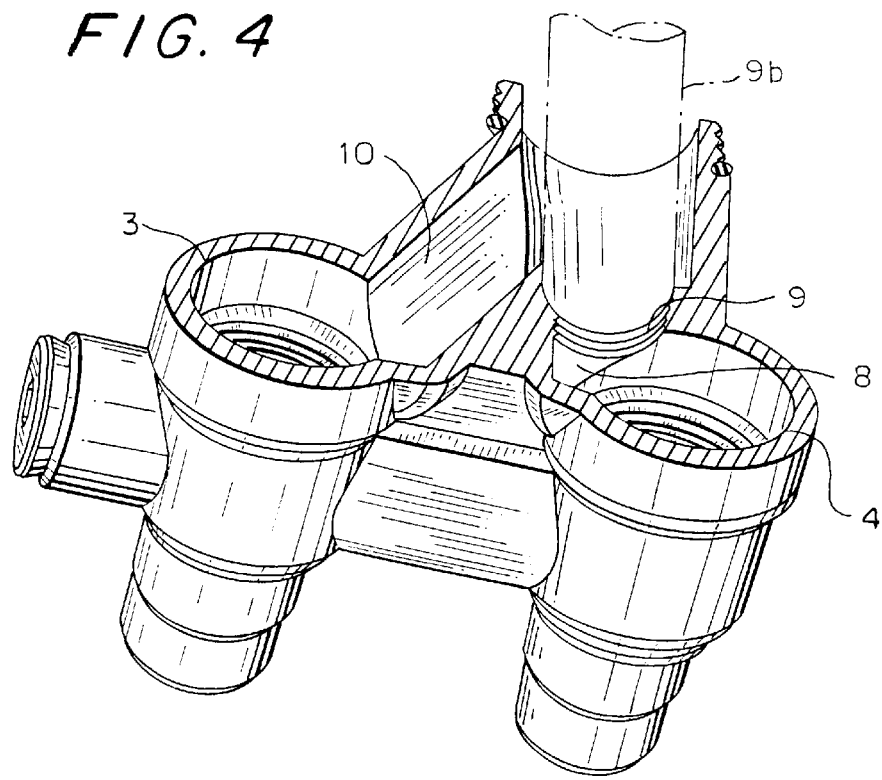
FIG. 4 shows the fitting housing according to FIG. 3, with a section through the connection piece for connection to the hot water tank.

FIGS. 3 and 4 show the fitting housing 1 configured for bottom mounting. As can be seen, the housing in FIGS. 3 and 4 is identical to the housing in FIGS. 1 and 2. However, the direction of flow has now been reversed so that the channel 3 is the cold water inlet whilst the channel 4 is the blended water outlet.

A loose end piece 28 is screwed in place in the cold water inlet 3, and a loose end piece 29 is screwed in place in blended water outlet 4. The end pieces 28 and 29 may be different and can be adapted to receive the spring 19 and designed to form the seat 24 for the valve body 23, respectively.

Figure 5:
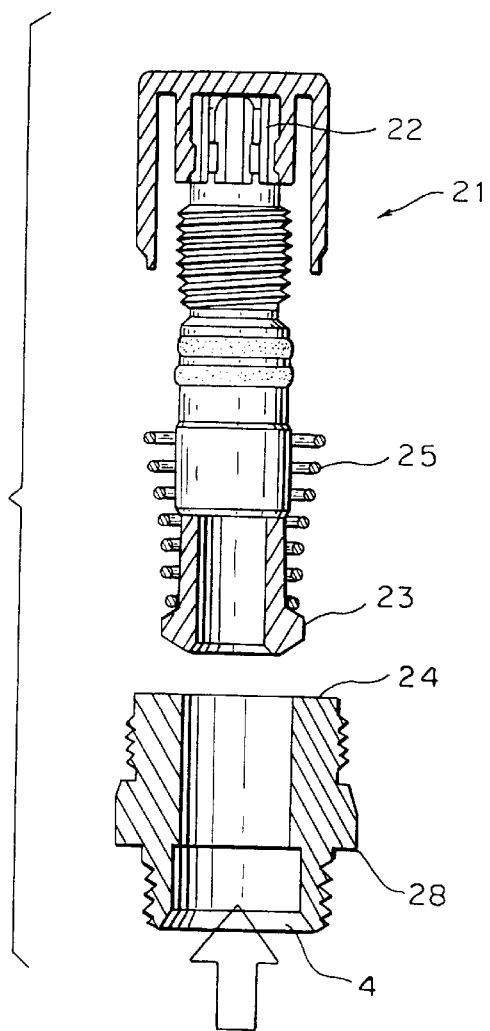
FIG. 5 is a sectional view of the shutoff and reflux valve.

In FIG. 5 an shutoff and reflux valve 21 is shown. The combined reflux and shutoff valve 21 consists of a valve spindle 22, a valve body 23 which is designed to rest against a valve seat 24, and a spring 25.

Figure 6:
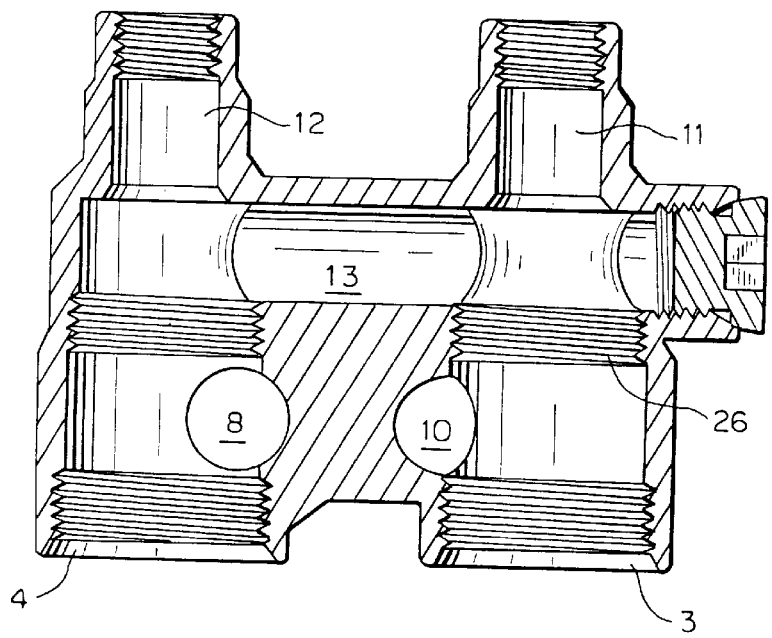
FIG. 6 is a horizontal section through the fitting housing.

FIG. 6 is a horizontal section through the fitting housing 1.

Figure 7:
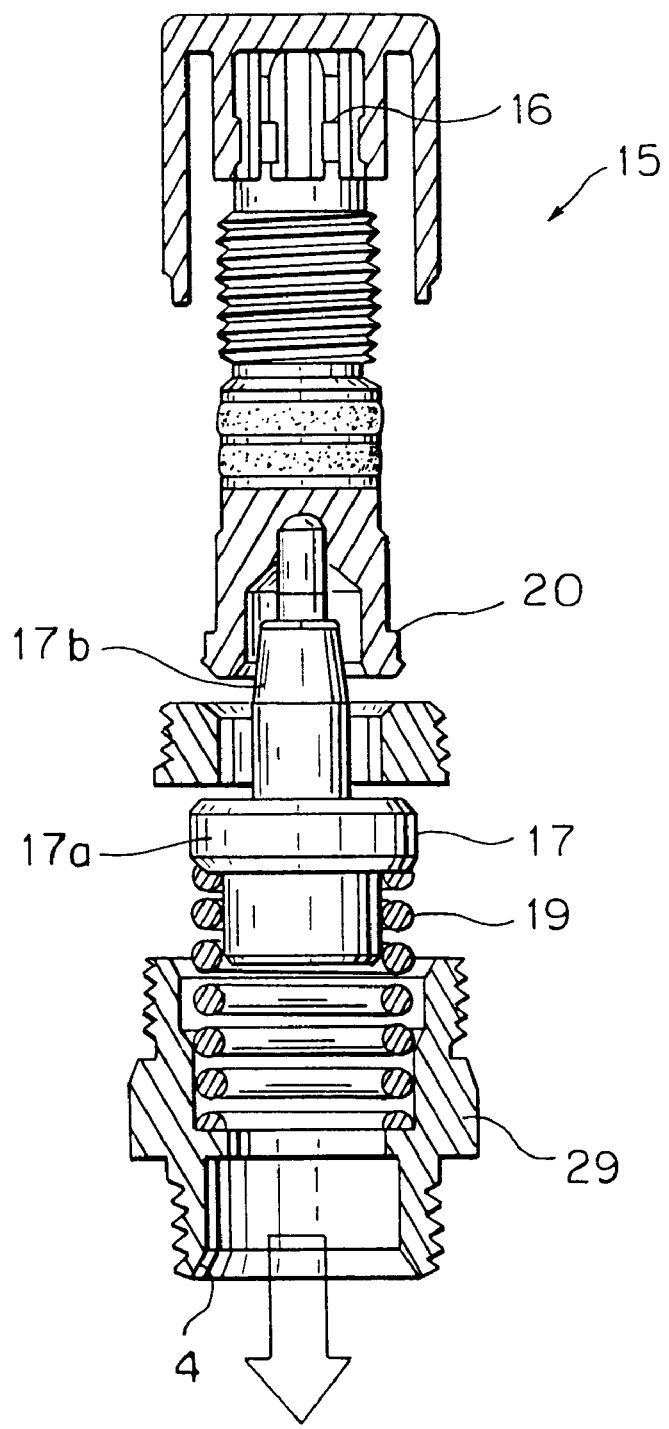
FIG. 7 is a sectional view of the mixing valve.

FIG. 7 shows the mixing valve 15. The mixing valve 15 consists of a valve spindle 16, a thermostat body 17 which interacts with a seat 18, and a spring 19, which is designed to force the thermostat body 17 towards the seat 18. The thermostat body 17 consists of two parts 17a and 17b. When the temperature rises, the parts 17a and 17b will be pushed apart, so that the contact face on the thermostat body 17 is pressed further away from the seat 18. The mixing valve 15 is also equipped with a valve body 20, which is designed to rest against the back of the seat 18, in order to block a cross connection 27 between the cold water connection 13 and the blended water outlet 4.

Figure 8:
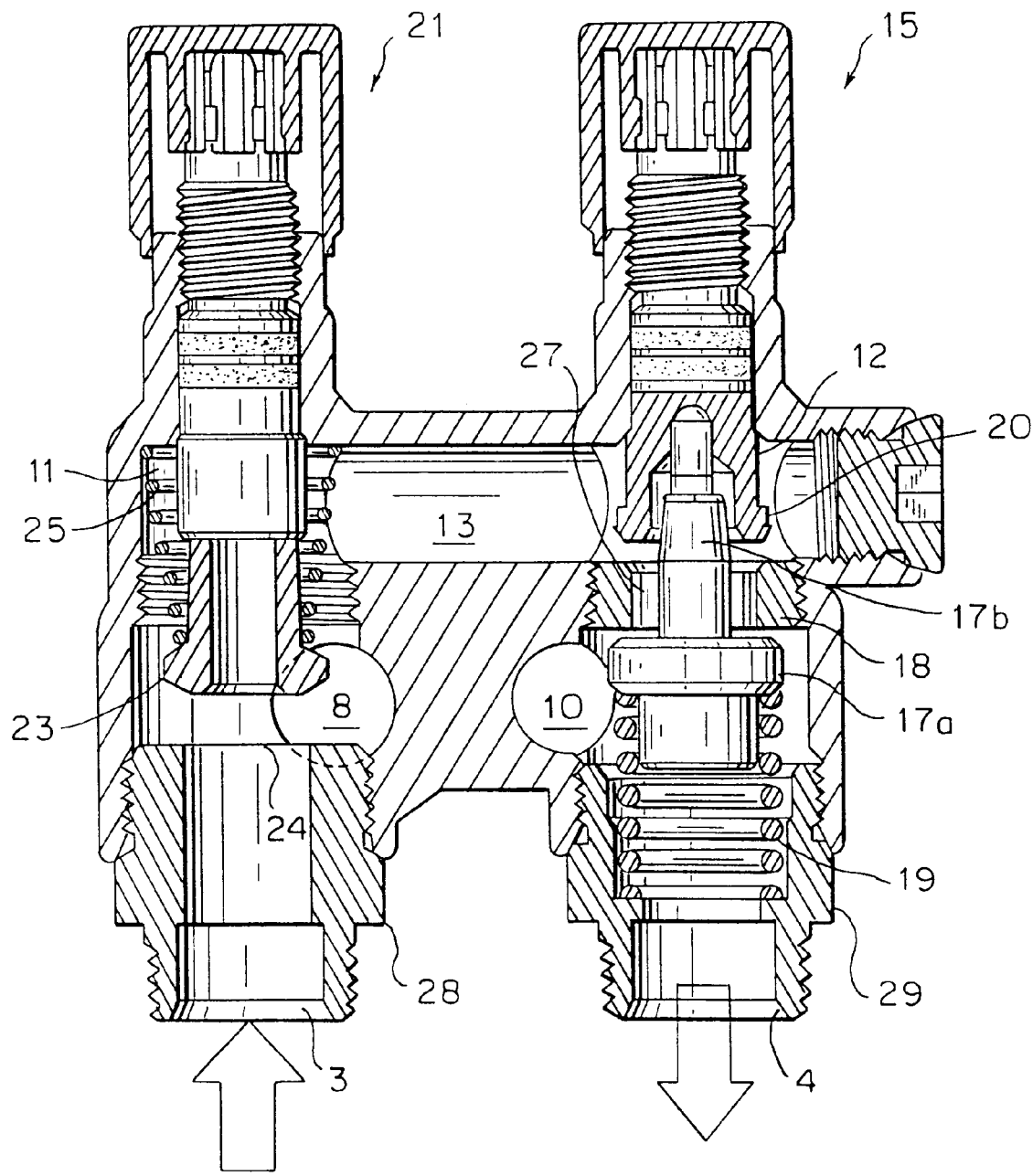
FIG. 8 is a section through the fitting configured for top or side mounting, and shows the mixing valve and the combined reflux and shutoff valve when open.

FIG. 8 shows a section through the fitting, the valve spindles and valve bodies for respectively the mixing valve and the combined shutoff and reflux valve having been inserted.

FIG. 8 shows a valve for top or side mounting. In the illustrated position, the combined shutoff and reflux valve has been screwed out fully so that the valve body 23 is spaced apart from the seat 24. Thus, it is open for the inflow of cold water through the cold water inlet 3. The valve body 23 can now move away from the seat 24 against the force of the spring 25, if the water pressure in the cold water inlet 3 is sufficient to overcome the joint force exerted on the valve body 23 by the spring 25 and pressure, if any, on this side of the valve body 23. In this situation cold water will be able to flow in through the cold water inlet 3 and in through the channel 8 to the bottom of the water heater, and force hot water from the top of the heater up through the oblique channel 10 and out through the blended water outlet 4. In this case cold water will be mixed with the hot water since the valve body 20 is spaced apart from the valve seat 18, and the cross connection 27 between the cold water connection 13 and the blended water outlet 4 is thus open.

Figure 9:
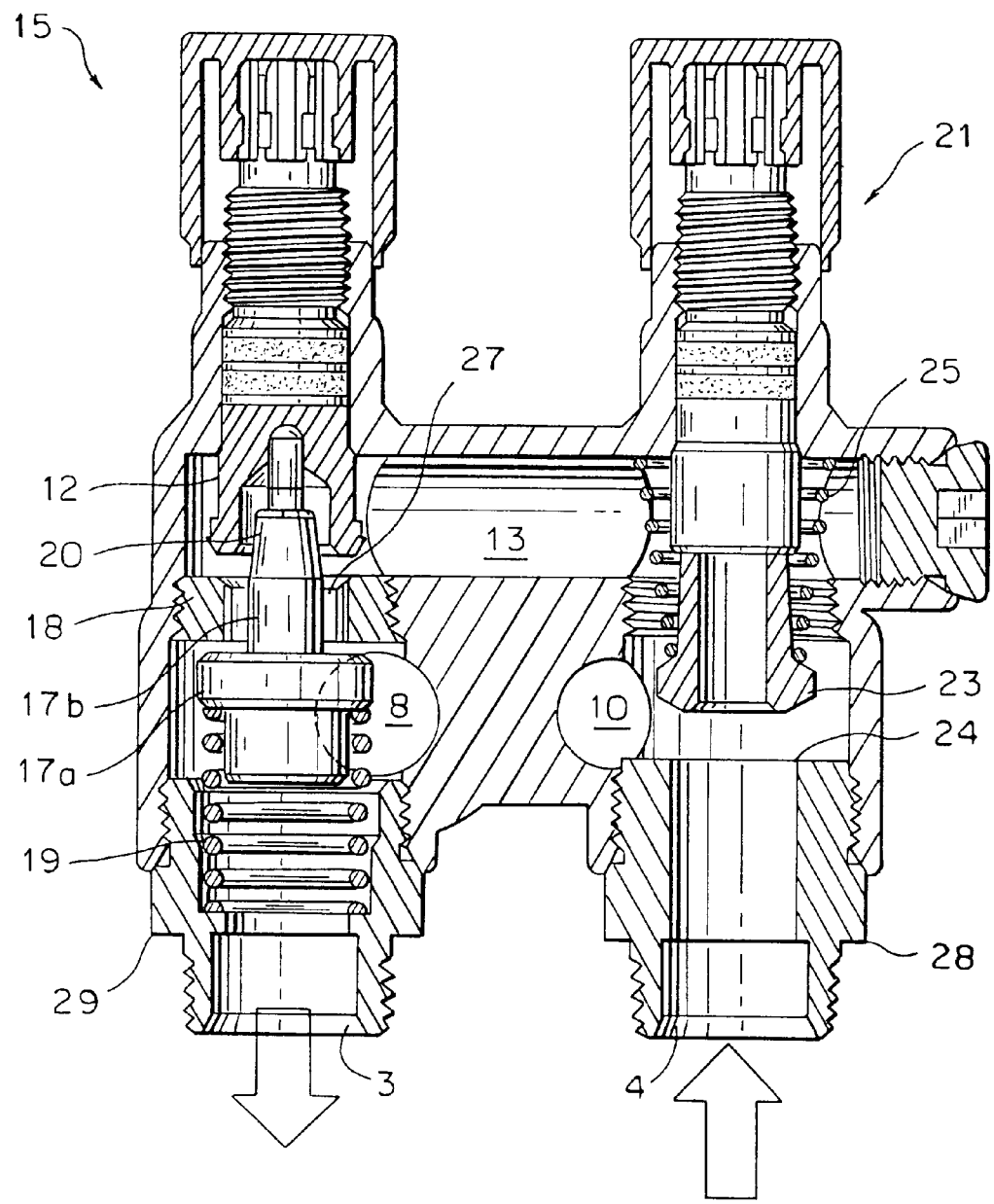
FIG. 9 is a section like that in FIG. 4 but now configured for bottom mounting, and where the combined reflux and shutoff valve and the mixing valve are open.

In FIG. 9 the same is shown for a valve intended for bottom mounting. Now cold water can flow from the cold water inlet 4, partly through the oblique channel 10 and into the bottom of the hot water tank, and partly through the cold water connection 13, past the valve body 20 and the valve seat 18 in the cross connection 27, mix with the hot water which flows down through the channel 8, and pass out through the blended water outlet 3. The thermostat body 17 will regulate the size of the passage in the cross connection 27 between the valve seat 18 and the thermostat body 17, depending upon the temperature of the hot water which flows down through the channel 8, in that the two parts 17a and 17b of the thermostat body, as mentioned above, are forced apart when the temperature of the hot water rises, as will be well known to a person versed in the art. The spring 19 will ensure that the two parts 17a and 17b of the thermostat body 17 are pressed together when the hot water becomes colder again.

The same fitting housing can be used irrespective of whether the mixer fitting is to be positioned in connection with the top of the tank, its bottom or its side. All other components in the fitting can also be used. The spindle bores 11 and 12 are made to be identical so that the spindle 16 can be placed in both the spindle bore 11 and spindle bore 12, the spindle 22 can be placed in the spindle bores 11 and 12, and the seat 18 can be screwed in on the threads 26 in the spindle bore 11 or on similar threads in the spindle bore 12. Both the channel 3 and the channel 4 can be connected to the cold water supply and function as a cold water inlet or be connected to the hot water distribution line and function as a blended water outlet.

Figure 10:
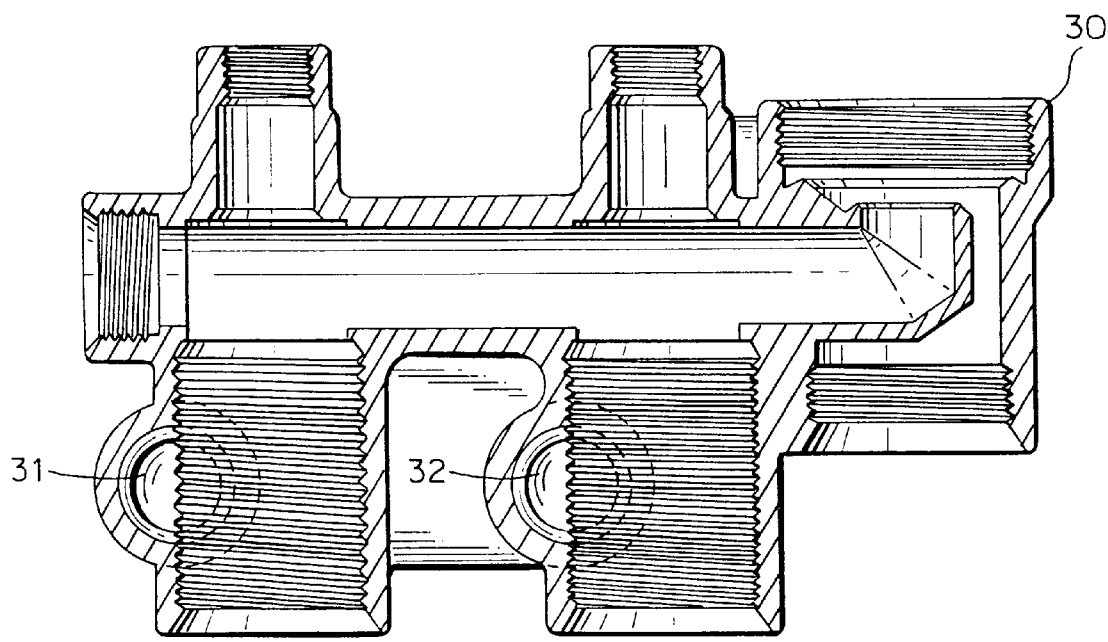
FIG. 10 shows the fitting housing in section equipped with bores for a safety valve.
Figure 11:
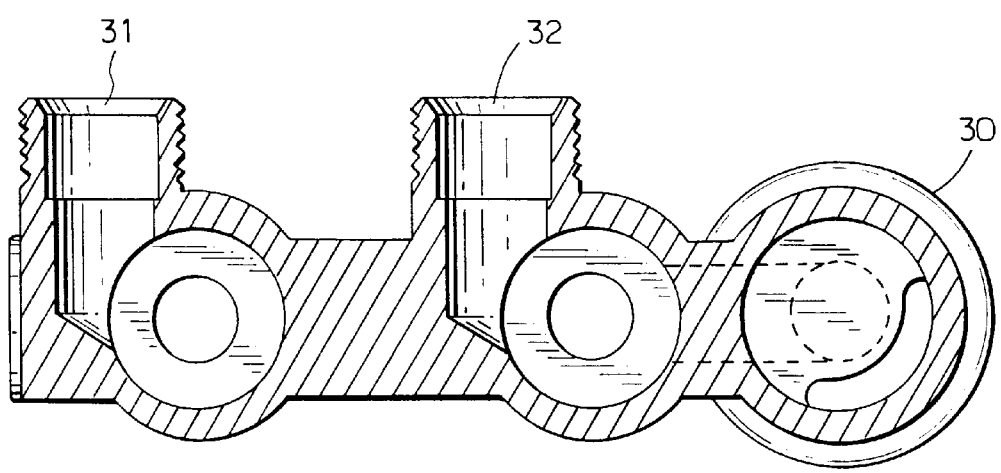
FIG. 11 shows the fitting housing according to FIG. 10 in sectional elevation.

FIGS. 10 and 11 show a fitting housing equipped with a housing part 30 for a safety valve and optionally also a draw-off valve. These valves are of a conventional type and therefore do not require further description. Of course, there must always be a safety valve in the fitting. In FIGS. 10 and 11, the concentric channels for cold and hot water, and the oblique channel 10 according to the embodiment in FIGS. 1–9, have been replaced by two identical channels 31 and 32 which are arranged in parallel relation to one another.

I claim:

1. In a fitting housing device which is to be equipped with a thermostat-controlled mixing valve (15) and a combined shutoff and reflux valve (21) adapted for connection in a cold water inlet pipe and hot water outlet pipe of a water heater, where the fitting housing (1) has two channels (8,10) for cold water and hot water, respectively, and a cross connection (27) for cold blending water therebetween, and where in the hot water channel (8) there is arranged a mixing valve (15), which is connected to a regulating spindle (16) arranged in a first spindle bore (12), and where the spindle of the shutoff and reflux valve (21) can be arranged in a second spindle bore (11), the improvements wherein the first spindle bore (12) and the second spindle bore (11) are designed such that the mixing valve (15) and the shutoff and reflux valve (21) are interchangeable relative to one another.

2. A fitting device according to claim 1, characterised in that the cold water inlet pipe is arranged concentrically inside the hot water outlet pipe, or vice versa, that the mixing valve (15) is equipped with a thermostat (17) and a valve body (17) spring-tensioned against a valve seat (18) in the cross connection (27), that the outlet spigot (4) of the hot water channel (8) is substantially transverse to a portion of the cold water channel (10) and opens into this via the cross connection (27), that the thermostat body of the thermostat (17), which constitutes the annular valve body (17), is spring-tensioned against the valve seat (18) in the mouth of the cross connection (27) in the hot water channel (8), that the first spindle bore (12) extends substantially transverse to said portion of the cold water channel (10) for interaction with a regulating device on the outside of the fitting housing (1), and that the second spindle bore (11) also extends substantially transverse to said portion of the cold water channel (10).

3. A device according to claim 2, characterised in that the cross connection (27) is connected to a cold water connection (13) which extends substantially transverse to the cross connection (27) and connects this to the cold water inlet (3).

4. A device according to claim 3, characterised in that the cold water connection (13) extends in a plane which is not coincident with the plane in which the hot water channel and the cold water channel extend, but which is parallel therewith.

5. A device according to claim 4, characterised in that the seat (18) is detachable and designed to be capable of being removed from the spindle bore (12) and inserted in the corresponding place in the spindle bore (11).

6. A device according to claim 5, characterised in that in the cold water inlet (3) there is inserted a loose end piece (28), that in the blended water outlet (4) there is inserted a loose end piece (29), or vice versa when the mixing valve (15) and the shutoff and reflux valve (21) have switched places, and that the end pieces (28) and (29) are different and are adapted to receive the spring (19) and designed to form a seat (24) for the valve body (23) of the shutoff and reflux valve (21), respectively.

7. A device according to claim 4, characterised in that in the cold water inlet (3) there is inserted a loose end piece (28), that in the blended water outlet (4) there is inserted a loose end piece (29), or vice versa when the mixing valve (15) and the shutoff and reflux valve (21) have switched places, and that the end pieces (28) and (29) are different and are adapted to receive the spring (19) and designed to form a seat (24) for the valve body (23) of the shutoff and reflux valve (21), respectively.

8. A device according to claim 3, characterised in that in the cold water inlet (3) there is inserted a loose end piece (28), that in the blended water outlet (4) there is inserted a loose end piece (29), or vice versa when the mixing valve (15) and the shutoff and reflux valve (21) have switched places, and that the end pieces (28) and (29) are different and are adapted to receive the spring (19) and designed to form a seat (24) for the valve body (23) of the shutoff and reflux valve (21), respectively.

9. A device according to claim 2, characterised in that in the cold water inlet (3) there is inserted a loose end piece (28), that in the blended water outlet (4) there is inserted a loose end piece (29), or vice versa when the mixing valve (15) and the shutoff and reflux valve (21) have switched places, and that the end pieces (28) and (29) are different and are adapted to receive the spring (19) and designed to form a seat (24) for the valve body (23) of the shutoff and reflux valve (21), respectively.

10. A device according to claim 1, characterised in that in the cold water inlet (3) there is inserted a loose end piece (28), that in the blended water outlet (4) there is inserted a loose end piece (29), or vice versa when the mixing valve (15) and the shutoff and reflux valve (21) have switched places, and that the end pieces (28) and (29) are different and are adapted to receive the spring (19) and designed to form a seat (24) for the valve body (23) of the shutoff and reflux valve (21), respectively.

11. A device according to claim 3, characterised in that the seat (18) is detachable and designed to be capable of being removed from the spindle bore (12) and inserted in the corresponding place in the spindle bore (11).

12. A device according to claim 2, characterised in that the seat (18) is detachable and designed to be capable of being removed from the spindle bore (12) and inserted in the corresponding place in the spindle bore (11).

13. A device according to claim 1, characterised in that the seat (18) is detachable and designed to be capable of being removed from the spindle bore (12) and inserted in the corresponding place in the spindle bore (11).

14. A device according to claim 1, characterised in that the cross connection (27) is connected to a cold water connection (13) which extends substantially transverse to the cross connection (27) and connects this to the cold water inlet (3).

15. A device according to claim 14, characterised in that the cold water connection (13) extends in a plane which is not coincident with the plane in which the hot water channel and the cold water channel extend, but which is parallel therewith.

16. A device according to claim 15, characterised in that the seat (18) is detachable and designed to be capable of being removed from the spindle bore (12) and inserted in the corresponding place in the spindle bore (11).

17. A device according to claim 14, characterised in that the seat (18) is detachable and designed to be capable of being removed from the spindle bore (12) and inserted in the corresponding place in the spindle bore (11).

18. A device according to claim 17, characterised in that in the cold water inlet (3) there is inserted a loose end piece (28), that in the blended water outlet (4) there is inserted a loose end piece (29), or vice versa when the mixing valve (15) and the shutoff and reflux valve (21) have switched places, and that the end pieces (28) and (29) are different and are adapted to receive the spring (19) and designed to form a seat (24) for the valve body (23) of the shutoff and reflux valve (21), respectively.

19. A device according to claim 16, characterised in that in the cold water inlet (3) there is inserted a loose end piece (28), that in the blended water outlet (4) there is inserted a loose end piece (29), or vice versa when the mixing valve (15) and the shutoff and reflux valve (21) have switched places, and that the end pieces (28) and (29) are different and are adapted to receive the spring (19) and designed to form a seat (24) for the valve body (23) of the shutoff and reflux valve (21), respectively.

20. A device according to claim 15, characterised in that in the cold water inlet (3) there is inserted a loose end piece (28), that in the blended water outlet (4) there is inserted a loose end piece (29), or vice versa when the mixing valve (15) and the shutoff and reflux valve (21) have switched places, and that the end pieces (28) and (29) are different and are adapted to receive the spring (19) and designed to form a seat (24) for the valve body (23) of the shutoff and reflux valve (21), respectively.

* * * * *